Patented June 18, 1935

2,005,223

UNITED STATES PATENT OFFICE 2,005,223

MANUFACTURE OF CELLULOSE ESTERS

Henry Dreyfus, London, England

No Drawing. Application March 18, 1933, Serial No. 661,568. In Great Britain April 5, 1932

22 Claims. (Cl. 260—101)

This invention relates to improvements in the manufacture of cellulose compounds, and more particularly to the manufacture of cellulose esters of organic acids.

According to the present invention cellulose or any of its near conversion products is esterified in presence of a hydrohalide acid and a hydrohalide of a nitrogen containing base e. g. an ammonium halide, a hydrazine halide or a hydrohalide of an organic base. Especially important catalyst mixtures for the purpose of the present invention are mixtures of hydrochloric acid with ammonium chloride or the hydrochloride of an organic base.

Hydrochloric acid, ammonium chloride and the hydrochlorides of certain organic bases are of course known catalysts in the esterification of cellulose, but it is found that the use of these catalysts separately does not yield satisfactory results. Thus, while hydrochloric acid has been known for a long time for promoting the esterification of cellulose, nevertheless it has never been used on the commercial scale, probably by reason of degradation of cellulose consequent upon the temperatures which it is necessary to use during the reaction. Similarly ammonium chloride and methylamine hydrochloride or even trimethylamine hydrochloride have been proposed as catalysts for esterification, but I find that it is practically impossible to obtain complete esterification of the cellulose using these catalysts even at high temperatures, and that, even where a substantial esterification of the cellulose takes place, degradation owing to the high temperature is substantial. It is therefore remarkable that mixtures of ammonium chloride with hydrochloric acid or of the hydrochlorides of organic bases with hydrochloric acid are capable of yielding clear esterification solutions, and at the same time yielding cellulose esters which have a sufficiently high viscosity, or in other words in which the cellulose molecule is sufficiently preserved, for commercial application.

The hydrochloric acid or other hydrohalide acid to be used as part of the catalyst mixture according to the invention may be present in any desired proportion in relation to the quantity of cellulose treated, and particularly in quantities of 5% and upwards, but it is found desirable not to increase the proportion of hydrochloric acid much above about 25% based on the weight of the cellulose, and preferably the quantity is between 5 and 15%. On the other hand, the quantity of ammonium chloride or other ammonium halide or other hydrohalide of an inorganic nitrogenous base, or of the hydrochloride or other hydrohalide of the organic base, may be very substantial, for example proportions up to 50% or more on the weight of the cellulose. Instead of using the chlorides or hydrochlorides with hydrochloric acid or in part replacement thereof bromides or hydrobromides and iodides or hydriodides may be used, and similarly hydrobromic or hydriodic acid may replace wholly or in part the hydrochloric acid.

The organic bases may be mono-alkylamines, for instance methylamine, ethylamine, propylamine, ethanolamine and the like, or corresponding dialkylamines. Tertiary bases, such as trimethylamine and pyridine, are not so advantageous. Cyclic bases, for instance aniline, benzylamine, cyclohexylamine and the like may be used.

In order to avoid degradation of the cellulose molecule, the acetylation or other esterification is preferably carried out at temperatures not exceeding 50° C. for the manufacture of cellulose esters suitable for the preparation of artificial silk and similar products where tensile strength is a matter of importance. However, the upper limit of temperature which is permissible is dependent on the amount of hydrochloric or other hydrohalide acid in relation to the cellulose. Thus, for instance, while 50° C. may be the highest permissible limit using about 20-25% of hydrochloric acid based on the cellulose higher temperatures are possible with more limited amounts of hydrochloric acid, such as 5% or under. Again where the object in view is to produce a cellulose derivative of relatively low viscosity characteristics, such as is suitable for the manufacture of lacquers and films, such strict control of the temperature is not so necessary, and in fact, as described in British Patent No. 326,515 in relation to the use of sulphuric acid as catalyst, the temperature may rise to a value bordering upon that necessary to produce a substantial degradation in order to obtain a good lacquer acetate. In esterifying to produce an ester suitable for artificial silk, it is desirable to employ an esterification temperature below 50° C., for example 15-30° C., and even down to normal atmospheric temperature or lower.

The ammonium or other inorganic halide or the hydrohalide of an organic base may if desired be prepared in the esterification mixture itself by suitable addition of the base to the hydrohalide acid.

As initial materials for acetylation or other esterification, cotton or other celluloses or near conversion products thereof or other cellulosic materials may be employed. Wood pulps, or bamboo, esparto or other materials containing encrusting matter and from which the lignin, pentosan, resin and like constituents have been substantially removed, as for example in sulphite pulp, soda pulp or sulphate pulp, may be employed, but are preferably subjected to an alkaline purifying treatment followed by a treatment with organic acids as described in U. S. Patent No. 1,711,110. The alkaline purifying treatment may, for example, be performed with caustic alkali of low concentration, such as 3% or under, with heating or boiling, or with caustic alkali of high concentration, such as 15-20% or more, in the cold or with only slight heating. The invention further contemplates the esterification of already esterified products and of cellulose ethers, and the term "cellulosic material" employed in the claims is to be understood as including such derivatives. Such already esterified or etherified products may for instance be slightly nitrated celluloses or cellulose ethers of a low degree of alkylation or aralkylation or may be oxyalkyl ethers of cellulose.

Before carrying out the esterification in accordance with the present invention, it is desirable to pretreat the cellulose in any suitable way to increase its reactivity. Thus, for instance, the cellulose may be pretreated with hydrochloric acid as described in U. S. Patents Nos. 1,911,069, 1,936,587 and 1,936,589. Such pretreatment is effected according to the said specifications without producing degradation of the cellulose molecule. The hydrochloric acid or other hydrohalide acid may be used in the pretreatment either alone or together with a lower aliphatic acid, for example acetic acid. Similarly lower aliphatic acids, for example acetic acid, formic acid, or lactic acid may be used alone for the pretreatment, as described for instance in U. S. Patent No. 1,731,299, or in the vapour state as described in U. S. Patent No. 1,831,101. The acid may be used in a small or large quantity for this purpose. Formic acid except when employed only in small quantities should be substantially removed before esterification, except when the subsequent esterification is for the manufacture of cellulose formate. In other cases it may be unnecessary to remove the organic acid used for the pretreatment, and similarly it is unnecessary to remove hydrochloric acid or other hydrohalide acid used for the pretreatment since it can be used as the whole or part of the acid required in the catalyst mixture for the esterification.

The esterification itself may be conducted in the presence of a solvent for the cellulose ester produced; acetic acid is particularly suitable in the case of manufacturing cellulose acetates but any other suitable solvents (or solvent mixtures) for the cellulose acetates or other cellulose esters may be employed. The acetic acid or equivalent solvent or solvent mixture may be present in any desired quantity, such as 4 to 6 times the weight of the cellulose or near conversion product. Small quantities, such for instance as ½ to 10% reckoned on the weight of the cellulose, of more powerful organic solvents for cellulose acetates or the other cellulose esters, such for example as ethylidene diacetate, lactic acid or its acetyl derivatives, may be added to the acetic acid or other solvent or solvent mixture, as indicated in U. S. Patent No. 1,711,111, or such more powerful solvents may be produced in the acetylation or other esterification solution, for example by addition of acetaldehyde to produce ethylidene diacetate by reaction with the acetic anhydride in the case of producing cellulose acetates.

As described in U. S. Patent No. 1,708,787 cellulose acetates of especially high viscosity characteristics can be obtained by conducting the acetylation in presence of acetic acid or equivalent solvents or solvent mixtures in an amount greater than six times, for example 8 to 20 times or more, the weight of the cellulose or cellulose conversion product used. With the present invention likewise the acetylation or other esterification may with advantage, for the production of very highly viscous cellulose acetates or other cellulose esters, be conducted in presence of similar large amounts of acetic acid or equivalent solvents or solvent mixtures, for example other higher fatty acids than acetic acid, or other suitable acids, or liquids such as chloroform, tetrachlorethane, or mixtures of such solvents or liquids.

Alternatively the acetylation or other esterification may be effected in suspension in liquid diluents, such for example as benzene or toluene or ethers, for instance diethyl and di-isopropyl ethers. The esterification in suspension may, for instance, be conducted on the lines indicated in French Patent No. 432,046 and its Patents of Addition Nos. 15,933 and 16,316. If desired solvents, for example acetic acid, may be present in addition to the liquid diluents. Furthermore acetic acid or equivalent solvent may again be used in quantities over six times the weight of the cellulose, for example 8-20 times or more, to obtain cellulose esters of high viscosity as described in U. S. Patent No. 1,708,787. In all such cases of using solvents in addition to liquid diluents in conducting the esterification in suspension, the liquid diluent should be present in sufficient quantity to prevent solution of the cellulose acetate or other cellulose ester produced.

As a further modification the esterification may be conducted substantially in absence of liquid solvents or diluents by employing vapours of acetic anhydride or other esterifying agent as described in U. S. Patent No. 1,831,102.

Fibres, fabrics or the like, for example of cotton or other natural cellulosic materials or of viscose artificial silk or of other regenerated cellulosic artificial fibres, may be acetylated or otherwise esterified by means of the present invention by carrying out the esterification either in suspension in presence of liquid diluents or substantially in absence of liquid solvents or diluents.

The esterification is preferably conducted with the aid of the acid anhydride corresponding to the required ester, for example acetic anhydride or butyric anhydride. Other esterifying agents, e. g. acid chlorides, may however be used. In the case of acid chlorides, since hydrochloric acid is formed during esterification, a smaller proportion of hydrohalide acid may be present initially than in the case when anhydrides are employed.

The primary cellulose acetate or other cellulose esters produced in accordance with the present invention may be used directly for working up into any desired commercial products, but it is preferable to apply secondary treatments for the purpose of conferring upon them solubility characteristics, and particularly solubility in acetone. Such secondary treatments may be conducted either in the primary esterification solutions or suspensions or after separation of the ester therefrom. The catalyst mixture present during the esterification may be present also during the secondary treatment or ripening operation, or if desired the quantity of mineral acid present may be either reduced or increased in accordance with the requirements of the ripening process. The ripening may be conducted at ordinary or moderate temperatures, particularly if the amount of mineral acid present is relatively small, or if desired the ripening may be accelerated by heating to relatively high or high temperatures, or even up to 80 or 100° C., though in the last case the presence of free mineral acid is preferably avoided. If desired, ripening may be effected in two or more stages. The nature of the catalysts used in accordance with the present invention makes it possible to produce acetone-soluble cellulose acetate of high acetyl content, for example 56–57% or 59% as compared with the normal commercial acetone-soluble cellulose acetate of about 52–54% acetyl figure. In consequence these cellulose acetates are relatively resistant to the action of the water and are capable of yielding artificial silks which resist considerably the delustering action of hot or boiling aqueous liquors or moist steam.

When esterification is effected in the presence of a solvent medium for the ester obtained, precipitation may be effected in any suitable manner, e. g. by introducing the esterification solution into a large bulk of water or other non-solvent liquid. A two-stage precipitation process, as described and claimed for example in U. S. application S. No. 648,980 filed December 27th, 1932, may be very advantageously employed.

The following examples are given to illustrate the invention but it is to be clearly understood that they are in no way limitative:—

Example 1

100 parts of cotton linters which have been pretreated with acetic acid, for example as described in U. S. Patent No. 1,731,299, are introduced into an acetylator containing 15 parts by weight of hydrochloric acid, 50 parts of ammonium chloride, and 400 parts of glacial acetic acid and 400 parts of acetic anhydride. The esterification is carried out at approximately atmospheric temperatures until a clear esterification solution is obtained, and the cellulose acetate may then be precipitated direct or if desired may be ripened and the esterification solution subsequently precipitated.

Example 2

100 parts of cotton linters which have been sprayed with about 10–15 parts of concentrated hydrochloric acid and allowed to stand with occasional turning for 2–3 hours at ordinary temperature, are introduced into an acetylator and 5 parts of hydrochloric acid added together with 60 parts of di-ethylamine hydrochloride, 400 parts glacial acetic acid, 400 parts acetic anhydride and 800 parts toluene. Esterification is carried out at about 20° C. and when complete the cellulose acetate which is obtained in suspension may be ripened either in solution or suspension.

Example 3

100 parts of chemical wood pulp is boiled for about 2 hours with 20 to 30 times its weight of 2% caustic soda and is then separated, washed and heated for 1 to 3 hours at about 80° C. with 400 to 600 parts of glacial acetic acid. After cooling 40 parts of aniline hydrochloride, 10 parts of hydrochloric acid and 400 parts of acetic anhydride are introduced and acetylation is effected at about 30° C. until a clear solution is obtained. The cellulose acetate may then be ripened in any suitable manner.

What I claim and desire to secure by Letters Patent is:—

1. The manufacture of organic esters of cellulose, comprising esterifying cellulosic material in the presence of a hydrohalide acid and a hydrohalide of a nitrogen containing base.

2. The manufacture of cellulose acetate, comprising acetylating cellulosic material in the presence of a hydrohalide acid and a hydrohalide of a nitrogen containing base.

3. The manufacture of organic esters of cellulose, comprising esterifying cellulosic material in the presence of hydrochloric acid and a hydrochloride of a nitrogen-containing base.

4. The manufacture of cellulose acetate, comprising acetylating cellulosic material in the presence of hydrochloric acid and a hydrochloride of a nitrogen-containing base.

5. The manufacture of organic esters of cellulose comprising esterifying cellulosic material in the presence of hydrochloric acid, and a hydrochloride of an organic base.

6. The manufacture of organic esters of cellulose, comprising esterifying cellulosic material in the presence of hydrochloric acid and ammonium chloride.

7. The manufacture of cellulose acetate, comprising acetylating cellulosic material in the presence of hydrochloric acid and ammonium chloride.

8. The manufacture of organic esters of cellulose, comprising esterifying cellulosic material in the presence of a hydrohalide of a nitrogen-containing base and a hydrohalide acid, the latter being employed in proportions of 5–15% on the weight of the cellulosic material.

9. The manufacture of organic esters of cellulose, comprising esterifying cellulosic material in the presence of a hydrochloride of an organic base, and hydrochloric acid, the latter being employed in proportions of 5–15% on the weight of the cellulosic material.

10. The manufacture of cellulose acetate, comprising acetylating cellulosic material in the presence of ammonium chloride and hydrochloric acid, the hydrochloric acid being employed in proportions of 5–15% on the weight of the cellulosic material.

11. The manufacture of organic esters of cellulose, comprising esterifying cellulosic material in the presence of a hydrohalide acid and a hydrohalide of a nitrogen-containing base at temperatures below 50° C.

12. The manufacture of cellulose acetate, comprising acetylating cellulosic material in the presence of ammonium chloride and hydrochloric acid, the hydrochloric acid being employed in proportions of 5–15% on the weight of the cellulosic material and the acetylation being carried out at temperatures below 50° C.

13. The manufacture of organic esters of cellulose, comprising pretreating cellulosic material with lower fatty acids and esterifying the pretreated material in the presence of a hydrohalide acid and a hydrohalide of a nitrogen-containing base.

14. The manufacture of cellulose acetate, comprising pretreating cellulosic material with lower fatty acids and acetylating the pretreated material in the presence of ammonium chloride and hydrochloric acid.

15. The manufacture of organic esters of cellulose, comprising esterifying cellulosic material in the presence of hydrochloric acid and a hydrochloride of a nitrogen-containing base, and subjecting the cellulose ester obtained to a ripening process.

16. The manufacture of organic esters of cellulose, comprising pretreating cellulosic material with lower fatty acids, esterifying the pretreated material in the presence of ammonium chloride and hydrochloric acid, and subjecting the cellulose ester obtained to a ripening process.

17. The manufacture of cellulose acetate, comprising pretreating cellulosic material with lower fatty acids, acetylating the pretreated material in the presence of hydrochloric acid and ammonium chloride, and ripening the product until an acetone-soluble cellulose acetate having an acetyl content of 56–59% is obtained.

18. The manufacture of cellulose acetate, comprising pretreating cellulosic material with lower fatty acids, acetylating the pretreated material at temperatures below 50° C. in the presence of ammonium chloride and hydrochloric acid, the hydrochloric acid being present in proportions of 5–15% on the weight of the cellulosic material, and subjecting the product to a ripening pretreatment until an acetone-soluble cellulose acetate having an acetyl content of 56–59% is obtained.

19. Organic esters of cellulose produced by esterifying cellulosic material in the presence of a catalyst consisting of a hydrohalide acid, and a hydrohalide of a nitrogen containing base.

20. Organic esters of cellulose produced by esterifying cellulosic material in the presence of a catalyst consisting of a hydrochloric acid and ammonium chloride.

21. Cellulose acetate produced by acetylating cellulose in the presence of a catalyst consisting of hydrochloric acid and ammonium chloride.

22. Cellulose acetate having an acetyl content of 56–59% and produced by acetylating cellulosic material in the presence of a catalyst consisting of a hydrohalide acid, and a hydrohalide of a nitrogen containing base.

HENRY DREYFUS.